US009898197B1

(12) United States Patent
Gao et al.

(10) Patent No.: US 9,898,197 B1
(45) Date of Patent: Feb. 20, 2018

(54) LOCK-FREE MEMORY MANAGEMENT

(71) Applicant: EMC Corporation, Hopkinton, MA (US)

(72) Inventors: Hongpo Gao, Beijing (CN); Geng Han, Beijing (CN); Jian Gao, Beijing (CN); Jianbin Jamin Kang, Beijing (CN); Lili Chen, Hopkinton, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 311 days.

(21) Appl. No.: 14/669,534

(22) Filed: Mar. 26, 2015

(51) Int. Cl.
*G06F 3/06* (2006.01)

(52) U.S. Cl.
CPC .............. *G06F 3/061* (2013.01); *G06F 3/067* (2013.01); *G06F 3/0644* (2013.01)

(58) Field of Classification Search
None
See application file for complete search history.

(56) References Cited

U.S. PATENT DOCUMENTS

| | | | | |
|---|---|---|---|---|
| 6,874,062 B1* | 3/2005 | Goldberg | .............. | G06F 3/0613 707/999.003 |
| 9,513,829 B1* | 12/2016 | Wang | .................... | G06F 3/0619 |
| 2007/0156997 A1* | 7/2007 | Boule | .................... | G06F 12/023 711/170 |
| 2010/0318998 A1* | 12/2010 | Golla | .................... | G06F 9/5011 718/104 |
| 2011/0314246 A1* | 12/2011 | Miller | .................... | G06F 3/0613 711/170 |
| 2013/0046951 A1* | 2/2013 | Jones | .................... | G06F 12/023 711/171 |
| 2014/0282589 A1* | 9/2014 | Kuang | .................. | G06F 9/5016 718/104 |

\* cited by examiner

*Primary Examiner* — Yaima Rigol
(74) *Attorney, Agent, or Firm* — Muirhead and Saturnelli, LLC (57) ABSTRACT

Described are techniques for memory management. An N-level bitmap is received, N>2. A memory pool is partitioned into slots each slot having a corresponding bit in level-1 of the N-level bitmap that indicates whether the slot is used or free. The slots are grouped into a hierarchy including N levels. A first thread receives a first request to allocate a first slot of the memory pool. Responsive to receiving the first request, the first thread performs first processing to allocate the first slot using the N-level bitmap. Allocation requests each to allocate slots from the memory pool are only processed by the first thread. A second thread receives a second request to free a second slot of the memory pool. Responsive to receiving the second request, the second thread performs second processing using the N-level bitmap to free the second slot. Requests to free slots are processed by multiple threads.

20 Claims, 8 Drawing Sheets

LOCK-FREE MEMORY MANAGEMENT

BACKGROUND

Technical Field

This application generally relates to resource management.

Description of Related Art

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more host processors and provide storage services to each host processor. Multiple data storage systems from one or more different vendors may be connected and may provide common data storage for one or more host processors in a computer system.

A host may perform a variety of data processing tasks and operations using the data storage system. For example, a host may perform basic system I/O (input/output) operations in connection with data requests, such as data read and write operations.

Host systems may store and retrieve data using a data storage system containing a plurality of host interface units, disk drives (or more generally storage devices), and disk interface units. Such data storage systems are provided, for example, by EMC Corporation of Hopkinton, Mass. The host systems access the storage devices through a plurality of channels provided therewith. Host systems provide data and access control information through the channels to a storage device of the data storage system and data of the storage device is also provided from the data storage system to the host systems also through the channels. The host systems do not address the disk drives of the data storage system directly, but rather, access what appears to the host systems as a plurality of logical units, logical devices or logical volumes. The logical units may or may not correspond to the actual physical drives. Allowing multiple host systems to access the single data storage system allows the host systems to share data stored therein.

In connection with data storage systems, or more generally, any suitable system having memory as a resource, different techniques may be used for memory management and memory organization. The memory management techniques may include, for example, memory allocation and memory release or freeing (e.g., deallocation) of allocated memory. The memory management techniques may take into account a variety of different factors, such as related to performance, fairness and efficiency, when considering requirements of the particular system or application for which memory management is being performed.

SUMMARY OF THE INVENTION

In accordance with one aspect of the invention is a method of performing memory management comprising: receiving an N-level bitmap, N being an integer greater than two, wherein a memory pool is partitioned into a plurality of slots, each slot of the memory pool having a corresponding bit in level-1 of the N-level bitmap, where the corresponding bit in level-1 of the N-level bitmap for said each slot indicates whether said each slot is used or free, wherein the plurality of slots of the memory pool are further grouped into a hierarchy including N levels; receiving, by a first thread, a first request to allocate a first slot of the memory pool; responsive to receiving the first request, said first thread performs first processing to allocate said first slot using the N-level bitmap, wherein allocation requests each to allocate one or more slots from the memory pool are only processed by the first thread; receiving by a second of a plurality of threads, a second request to free a second slot of the memory pool whereby the second slot is returned to the memory pool; and responsive to receiving the second request, said second thread performs second processing using the N-level bitmap to free said second slot, wherein requests each to free one or more slots of the memory pool are processed by the plurality of threads. Each bit in the level-1 of the N-level bitmap corresponding to one of the slots of the memory pool may have a value of zero if the one slot is used and otherwise has a value of one if the one slot is free. The plurality of slots of the memory pool may be partitioned into a plurality of sub pools, each of the plurality of sub pools including a same amount of the plurality of slots of the memory pool, each of the plurality of sub pools being associated with a different bit in level-2 of the level-N bitmap. The different bit may indicate whether said each sub pool is free or used. The different bit may have a value of one if all slots of said each sub pool are free, and otherwise the different bit may have a value of zero indicating said each sub pool is used. The plurality of sub pools may be partitioned into a plurality of clusters, each of said plurality of clusters including a same amount of the plurality of sub pools, each of the plurality of clusters being associated with a corresponding bit in level-3 of the level-N bitmap. The corresponding bit in level-3 of the level-N bitmap may indicate whether at least one sub pool of said each cluster is free. The corresponding bit in level-3 of the level-N bitmap may have a value of one if at least one sub pool of said each cluster is free wherein all slots of said at least one sub pool are free, and otherwise the corresponding bit in level-3 of the level-N bitmap may have a value of zero indicating all sub pools of said each cluster are used. The plurality of clusters may be partitioned into a plurality of cluster groups, each of said plurality of cluster groups including a same amount of the plurality of clusters, each of the plurality of cluster groups being associated with a corresponding bit in level-4 of the level-N bitmap. The corresponding bit in level-4 of the level-N bitmap may indicate whether at least one sub pool of said each cluster group is free. The corresponding bit in level-4 of the level-N bitmap may have a value of one if at least one sub pool of said each cluster group is free wherein all slots of said at least one sub pool are free, and otherwise the corresponding bit in level-4 of the level-N bitmap may have a value of zero indicating all sub pools of said each cluster group are used. The first processing may include determining whether a current sub pool includes a slot available for allocation; if the current sub pool includes an available slot, allocating said available slot as said first slot; and if it is determined that the current sub pool does not include a slot available for allocation, using the N-level bitmap to perform third processing to determine whether there is a free sub pool in the memory pool. The third processing may further comprise examining levels N through 2 of the N-level bitmap to locate a first sub pool wherein all slots of the first sub pool are free. The method may further comprise for each slot in the first sub pool having an associated bit in the level-1 bitmap, updating said associated bit in the level-1 bitmap to zero thereby indicating said each slot of the first sub pool is used;

and updating a second bit in level-2 of the N-level bitmap corresponding to the first sub pool to zero thereby indicating said first sub pool is used. The method may also include determining a cluster including the first sub pool, said cluster having a corresponding third bit in level-3 of the N-level bitmap corresponding to the cluster; and setting the third bit to zero if each sub pool of the cluster has a corresponding bit in the level-2 of the N-level bitmap currently set to zero thereby indicating that said each sub pool is used. The second processing may include updating a first bit of level-1 of the N-level bitmap, said first bit corresponding to said second slot and said updating setting the first bit to one thereby indicating said second slot as free. A second sub pool may include the second slot, said second sub pool being associated with a corresponding bit of level-2 of the N-level bitmap, and the method may include determining whether all slots in the second sub pool are free; responsive to determining that all slots in the second sub pool are free, performing other processing including: setting the corresponding bit of level-2 of the N-level bitmap associated with the second sub pool to one thereby indicating all slots of the second sub pool are free; and determining a first cluster including the second sub pool; and updating a third bit in level-3 of the N-level bitmap associated with the first cluster to one thereby indicating at least one sub pool of the first cluster is free whereby all slots of the at least one sub pool are free. The memory pool may be a first of a plurality of memory pools of a system. The first memory pool may be partitioned into slots each of a first size and a second of the plurality of memory pools may partitioned into slots each of a second size different from the first size. Memory management of the second memory pool may be performed using a third thread and another plurality of threads where only the third thread processes requests to allocate slots from the second memory pool using a second N-level bitmap. Each thread of the another plurality of threads may perform processing using the second N-level bitmap to free slots returned to the second memory pool.

In accordance with another aspect of the invention is a system comprising: a processor; and a memory comprising code stored thereon that, when executed by the processor, performs a method of memory management comprising: receiving an N-level bitmap, N being an integer greater than two, wherein a memory pool is partitioned into a plurality of slots, each slot of the memory pool having a corresponding bit in level-1 of the N-level bitmap, where the corresponding bit in level-1 of the N-level bitmap for said each slot indicates whether said each slot is used or free, wherein the plurality of slots of the memory pool are further grouped into a hierarchy including N levels; receiving, by a first thread, a first request to allocate a first slot of the memory pool; responsive to receiving the first request, said first thread performs first processing to allocate said first slot using the N-level bitmap, wherein allocation requests each to allocate one or more slots from the memory pool are only processed by the first thread; receiving by a second of a plurality of threads, a second request to free a second slot of the memory pool whereby the second slot is returned to the memory pool; and responsive to receiving the second request, said second thread performs second processing using the N-level bitmap to free said second slot, wherein requests each to free one or more slots of the memory pool are processed by the plurality of threads.

In accordance with another aspect of the invention is a computer readable medium comprising code stored thereon that, when executed, performs a method of memory management comprising: receiving an N-level bitmap, N being an integer greater than two, wherein a memory pool is partitioned into a plurality of slots, each slot of the memory pool having a corresponding bit in level-1 of the N-level bitmap, where the corresponding bit in level-1 of the N-level bitmap for said each slot indicates whether said each slot is used or free, wherein the plurality of slots of the memory pool are further grouped into a hierarchy including N levels; receiving, by a first thread, a first request to allocate a first slot of the memory pool; responsive to receiving the first request, said first thread performs first processing to allocate said first slot using the N-level bitmap, wherein allocation requests each to allocate one or more slots from the memory pool are only processed by the first thread; receiving by a second of a plurality of threads, a second request to free a second slot of the memory pool whereby the second slot is returned to the memory pool; and responsive to receiving the second request, said second thread performs second processing using the N-level bitmap to free said second slot, wherein requests each to free one or more slots of the memory pool are processed by the plurality of threads. Each bit in the level-1 of the N-level bitmap corresponding to one of the slots of the memory pool may have a value of zero if said one slot is used and otherwise may have a value of one if said one slot is free. The plurality of slots of the memory pool may be partitioned into a plurality of sub pools, each of the plurality of sub pools including a same amount of the plurality of slots of the memory pool, each of the plurality of sub pools being associated with a different bit in level-2 of the level-N bitmap. The different bit may indicate whether said each sub pool is free or used.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF EMBODIMENT(S)

Figure 1:
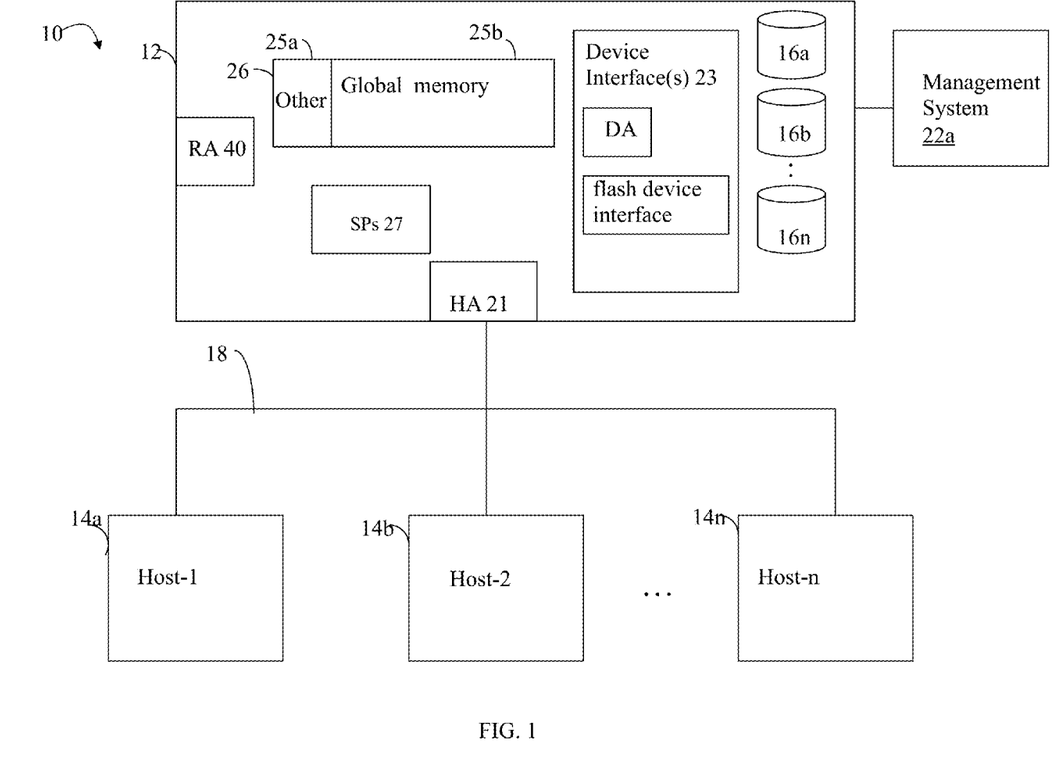
FIG. 1 is an example of an embodiment of a system that may utilize the techniques described herein.

Referring to FIG. 1, shown is an example of an embodiment of a system that may be used in connection with performing the techniques described herein. The system 10 includes a data storage system 12 connected to host systems 14a-14n through communication medium 18. In this embodiment of the computer system 10, and the n hosts 14a-14n may access the data storage system 12, for example, in performing input/output (I/O) operations or data requests. The communication medium 18 may be any one or more of a variety of networks or other type of communication connections as known to those skilled in the art. The communication medium 18 may be a network connection, bus, and/or other type of data link, such as a hardwire or other connections known in the art. For example, the communication medium 18 may be the Internet, an intranet, network (including a Storage Area Network (SAN)) or other wireless or other hardwired connection(s) by which the host systems 14a-14n may access and communicate with the data storage system 12, and may also communicate with other components included in the system 10.

Each of the host systems 14a-14n and the data storage system 12 included in the system 10 may be connected to the communication medium 18 by any one of a variety of connections as may be provided and supported in accordance with the type of communication medium 18. The processors included in the host computer systems 14a-14n may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage system 12 are described herein in more detail, and may vary with each particular embodiment. Each of the host computers 14a-14n and data storage system may all be located at the same physical site, or, alternatively, may also be located in different physical locations. Examples of the communication medium that may be used to provide the different types of connections between the host computer systems and the data storage system of the system 10 may use a variety of different communication protocols such as SCSI, Fibre Channel (FC), iSCSI, and the like. Some or all of the connections by which the hosts and data storage system may be connected to the communication medium may pass through other communication devices, such switching equipment that may exist such as a phone line, a repeater, a multiplexer or even a satellite.

Each of the host computer systems may perform different types of data operations in accordance with different types of tasks. In the embodiment of FIG. 1, any one of the host computers 14a-14n may issue a data request to the data storage system 12 to perform a data operation. For example, an application executing on one of the host computers 14a-14n may perform a read or write operation resulting in one or more data requests to the data storage system 12.

It should be noted that although element 12 is illustrated as a single data storage system, such as a single data storage array, element 12 may also represent, for example, multiple data storage arrays alone, or in combination with, other data storage devices, systems, appliances, and/or components having suitable connectivity, such as in a SAN, in an embodiment using the techniques herein. It should also be noted that an embodiment may include data storage arrays or other components from one or more vendors. In subsequent examples illustrated the techniques herein, reference may be made to a single data storage array by a vendor, such as by EMC Corporation of Hopkinton, Mass. However, as will be appreciated by those skilled in the art, the techniques herein are applicable for use with other data storage arrays by other vendors and with other components than as described herein for purposes of example.

The data storage system 12 may be a data storage array including a plurality of data storage devices 16a-16n. The data storage devices 16a-16n may include one or more types of data storage devices such as, for example, one or more rotating disk drives and/or one or more solid state drives (SSDs). An SSD is a data storage device that uses solid-state memory to store persistent data. An SSD using SRAM or DRAM, rather than flash memory, may also be referred to as a RAM drive. SSD may refer to solid state electronics devices as distinguished from electromechanical devices, such as hard drives, having moving parts. Flash devices or flash memory-based SSDs are one type of SSD that contains no moving parts.

The data storage array may also include different types of adapters or directors, such as an HA 21 (host adapter), RA 40 (remote adapter), and/or device interface 23. Each of the adapters may be implemented using hardware including a processor with local memory with code stored thereon for execution in connection with performing different operations. The HAs may be used to manage communications and data operations between one or more host systems and the global memory (GM). In an embodiment, the HA may be a Fibre Channel Adapter (FA) or other adapter which facilitates host communication. The HA 21 may be characterized as a front end component of the data storage system which receives a request from the host. The data storage array may include one or more RAs that may be used, for example, to facilitate communications between data storage arrays. The data storage array may also include one or more device interfaces 23 for facilitating data transfers to/from the data storage devices 16a-16n. The data storage interfaces 23 may include device interface modules, for example, one or more disk adapters (DAs) (e.g., disk controllers), adapters used to interface with the flash drives, and the like. The DAs may also be characterized as back end components of the data storage system which interface with the physical data storage devices.

One or more internal logical communication paths may exist between the device interfaces 23, the RAs 40, the HAs 21, and the memory 26. An embodiment, for example, may use one or more internal busses and/or communication modules. For example, the global memory portion 25b may be used to facilitate data transfers and other communications between the device interfaces, HAs and/or RAs in a data storage array. In one embodiment, the device interfaces 23 may perform data operations using a cache that may be included in the global memory 25b, for example, when communicating with other device interfaces and other components of the data storage array. The other portion 25a is that portion of memory that may be used in connection with other designations that may vary in accordance with each embodiment.

The particular data storage system as described in this embodiment, or a particular device thereof, such as a disk or particular aspects of a flash device, should not be construed as a limitation. Other types of commercially available data storage systems, as well as processors and hardware controlling access to these particular devices, may also be included in an embodiment.

Host systems provide data and access control information through channels to the storage systems, and the storage systems may also provide data to the host systems also through the channels. The host systems do not address the drives or devices 16a-16n of the storage systems directly, but rather access to data may be provided to one or more host systems from what the host systems view as a plurality of logical devices, logical volumes (LVs) which may also referred to herein as logical units (e.g., LUNs). A logical unit (LUN) may be characterized as a disk array or data storage system reference to an amount of disk space that has been formatted and allocated for use to one or more hosts. A logical unit may have a logical unit number that is an I/O address for the logical unit. As used herein, a LUN or LUNs may refer to the different logical units of storage which may be referenced by such logical unit numbers. The LUNs may or may not correspond to the actual or physical disk drives or more generally physical storage devices. For example, one or more LUNs may reside on a single physical disk drive, data of a single LUN may reside on multiple different physical devices, and the like. Data in a single data storage system, such as a single data storage array, may be accessed by multiple hosts allowing the hosts to share the data residing therein. The HAs may be used in connection with communications between a data storage array and a host system. The RAs may be used in facilitating communications between two data storage arrays. The DAs may be one type of device interface used in connection with facilitating data transfers to/from the associated disk drive(s) and LUN (s) residing thereon. A flash device interface may be another type of device interface used in connection with facilitating data transfers to/from the associated flash devices and LUN(s) residing thereon. It should be noted that an embodiment may use the same or a different device interface for one or more different types of devices than as described herein.

In an embodiment in accordance with techniques herein, the data storage system as described may be characterized as having one or more logical mapping layers in which a logical device of the data storage system is exposed to the host whereby the logical device is mapped by such mapping layers of the data storage system to one or more physical devices. Additionally, the host may also have one or more additional mapping layers so that, for example, a host side logical device or volume is mapped to one or more data storage system logical devices as presented to the host.

The device interface, such as a DA, performs I/O operations on a physical device or drive 16a-16n. In the following description, data residing on a LUN may be accessed by the device interface following a data request in connection with I/O operations that other directors originate. The DA which services the particular PD may perform processing to either read data from, or write data to, the corresponding physical device location for an I/O operation.

Also shown in FIG. 1 is a management system 22a that may be used to manage and monitor the system 12. In one embodiment, the management system 22a may be a computer system which includes data storage system management software such as may execute in a web browser.

It should be noted that each of the different adapters, such as HA21, DA or disk interface, RA, and the like, may be implemented as a hardware component including, for example, one or more processors, one or more forms of memory, and the like. Code may be stored in one or more of the memories of the component for performing processing.

It should be noted that an embodiment of a data storage system may include components having different names from that described herein but which perform functions similar to components as described herein. Additionally, components within a single data storage system, and also between data storage systems, may communicate using any suitable technique that may differ from that as described herein for exemplary purposes. For example, element 12 of FIG. 1 may be a data storage system, such as the VNXe® data storage system by EMC Corporation of Hopkinton, Mass., that includes multiple storage processors (SPs). Each of the SPs 27 may be a CPU including one or more "cores" or processors and each may have their own memory used for communication between the different front end and back end components rather than utilize a global memory accessible to all storage processors. In such embodiments, memory 26 may represent memory of each such storage processor.

It should be noted that techniques herein may be described in examples of embodiments with management of memory, such as may be included in a data storage system. However, those skilled in the art will appreciate that techniques herein may be more generally applied to any suitable resource of any suitable system or component.

Described in following paragraphs are techniques that may be used in connection with resource management, such as memory management, using a multi-level bitmap and lock-free management techniques. As applied to memory management, techniques herein take into account factors in connection with memory allocation and release performance, allocation fairness, block size or memory usage efficiency, as well as memory fragmentation. Techniques in following paragraphs describe an embodiment of a lock free memory algorithm with a constant memory allocating and releasing time.

Figure 2:
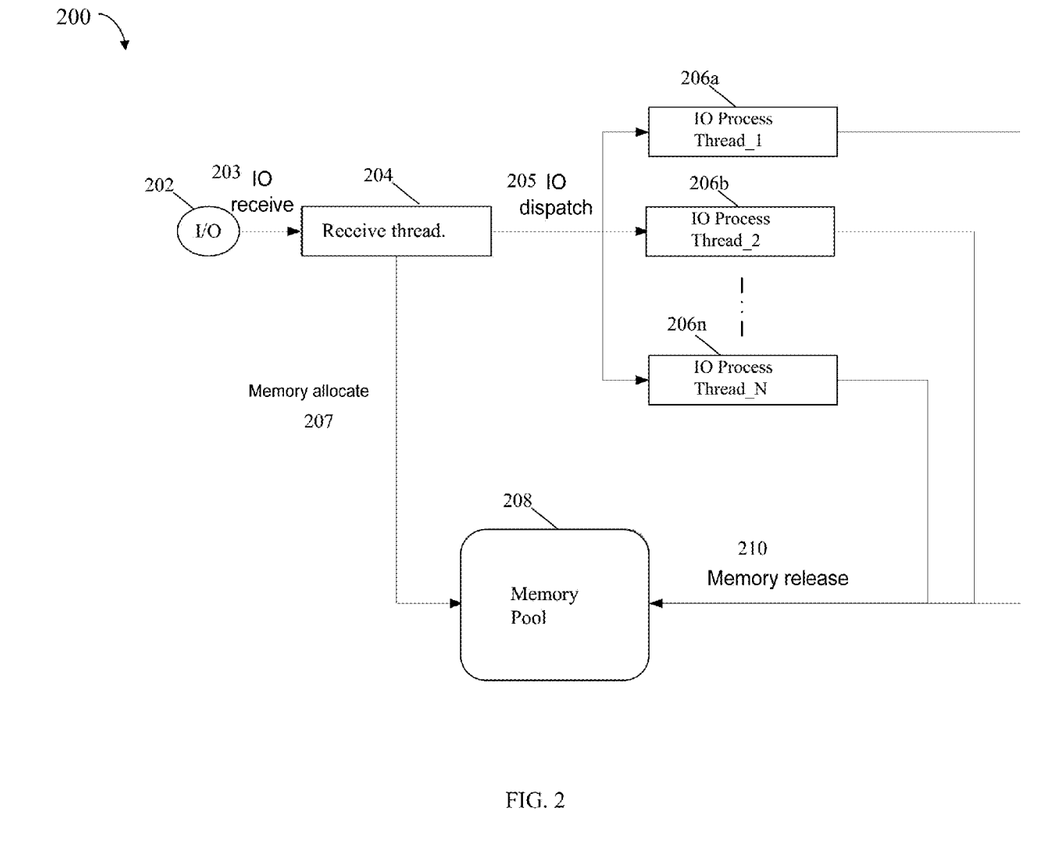
FIG. 2 is an example of a memory pool and various threads that may be included in an embodiment in accordance with techniques herein.

Referring to FIG. 2, shown is an example 200 of processing that may be performed in connection with processing I/Os requiring memory allocation and then servicing the I/Os in an embodiment in accordance with techniques herein. Generally, I/Os arriving at the system 202 are received 203 by a single thread 204. This receiving thread 204 allocates memory 207 from a memory pool 208 for this I/O 202 according to the I/O size, and then dispatches 205 the I/O 202 for further processing by one of the N I/O processing threads 206a-n. When the selected one of the I/O processing threads 206a-n completes processing the I/O 202, the memory allocated in step 207 from the memory pool 208 for use in processing the I/O 202 is released, deallocated, or returned 210 back to the memory pool 208. Thus, in the embodiment described herein for management of the memory pool 208, there is a single receiving thread 204 that allocates memory 207 from the pool 208 for use by a received I/O 202, but multiple threads 206a-n may release or deallocate memory, such as in parallel.

An embodiment in accordance with techniques herein may partition the memory pool 208 into partitions or chunks of memory each of the same size. In this manner, the memory allocated 207 may be a multiple of such size as needed for each particular I/O 202 received.

In at least one embodiment, techniques herein may be applied for use in a data storage system that is I/O intensive. To improve I/O throughout, techniques herein may be used to improve the processing of each I/O through efficient memory allocation and release since processing for memory allocation and releasing may largely contribute to the overall I/O processing time. In this manner, optimization of memory management may significantly improve I/O performance.

Figure 3:
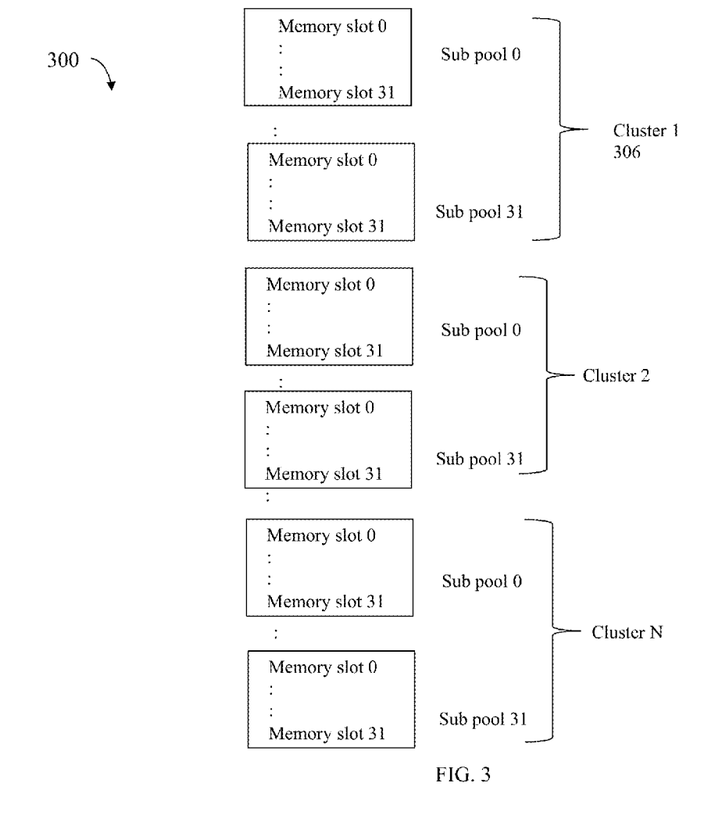
FIG. 3 is an example of a hierarchical memory organization that may be used in an embodiment in accordance with techniques herein.

Referring to FIG. 3, shown is an example illustrating how the memory pool may be partitioned for use in an embodiment in accordance with techniques herein. The example 300 illustrates that the memory pool may be viewed as a continuous memory chunk partitioned into a series of sub pools where each sub pool includes 32 memory slots, denoted 0-31 inclusively, where each slot corresponds to a chunk of memory the same size. Each set of 32 continuous sub-pools, denoted 0-31 inclusively, may be combined into a sub-pool-cluster, also referred to as cluster. For example, as shown in FIG. 3, cluster 1 306 may include 32 sub pools, where each of the 32 sub pools of cluster 1 306 further includes 32 memory slots. In a similar manner, the remainder of the pool may be partitioned to generally form N clusters as illustrated in FIG. 3.

Techniques herein may use a multi-level bitmap to track the free status of each slot, as well as each sub-pool and each sub pool cluster. Without loss of generality, one embodiment in accordance with techniques herein using the partitioning arrangement of FIG. 3 may use a 3-level bitmap as described below and illustrated in FIG. 4. Additionally, techniques herein may use a variable, global slot_index, to indicate the next available slot in the current working sub-pool.

Figure 4:
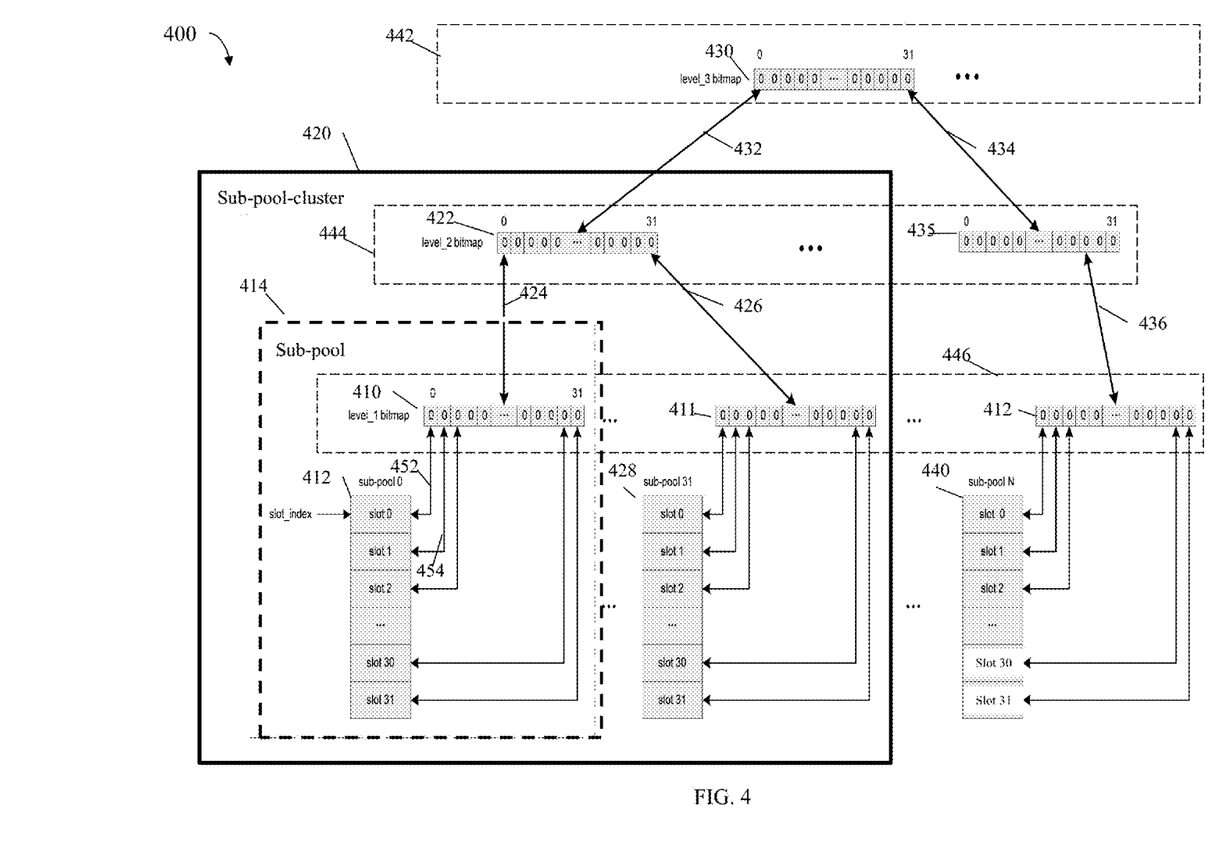
FIG. 4 is an example of an N-level bitmap and associated memory slots that may be used in an embodiment in accordance with techniques herein.

Referring to FIG. 4, shown is an example illustrating a 3-level bitmap and mapping or relationship to the memory partitioning of FIG. 3 in an embodiment in accordance with techniques herein. As noted above, each sub pool may include 32 memory slots of the same size where slots in each sub pool may be denoted in FIG. 4 as slot_0 to slot_31.

Dashed box 446 includes bit positions of the level-1 bitmap. Dashed box 444 includes bit positions of the level-2 bitmap and dashed box 442 includes bit position of the level-3 bitmap.

In the level-1 bitmap 446, each bit correspondents to one slot. In one embodiment, every 32 bits may correspond to a word size so each word in the level-1 bitmap may correspond to a sub pool. For each slot having a corresponding bit in the level-1 bitmap 446, a value of 0 indicates the corresponding slot is used or allocated and a value of 1 indicates the corresponding slot is free. For example, element 414 may denote the sub pool 0 memory 412 and the portion 410 of the level-1 bitmap associated with sub pool 0 412. Each memory slot of 412 may have an associated bit position in portion 410 of the level-1 bitmap. For example, slot 0 of sub pool 1 is mapped 452 to a corresponding bit in the level-1 bitmap, slot 1 of sub pool 1 is mapped 454 to a corresponding bit in the level-1 bitmap, and the like.

In the level-2 bitmap 444, each bit correspondents to one sub pool. In one embodiment, every 32 bits may correspond to a word size so each word in the level-2 bitmap may correspond to 32 sub pools or a sub pool cluster. Every 32 continuous sub pools may form a different sub pool cluster. Element 420 may denote the memory slots and portions of the level-1 and level-2 bitmap associated with sub pool cluster 1 (or simply cluster 1). For example, sub pool 0 412 is associated 424 with bit position 0 in the level-2 bitmap portion 422 for cluster 1, and sub pool 31 is associated 426 with bit position 31 in the level-2 bitmap portion 422. Each bit in the level-2 bitmap associated with a sub pool has a 0 value if the associated sub pool is used, and a value of 1 if the associated sub pool is free. Thus, for a selected bit in the level-2 bitmap where the selected bit is associated with a particular sub pool, if the selected bit has a value of 1, the selected bit indicates that all slots in the particular sub pool are free.

In the level-3 bitmap 442, each bit corresponds to one sub-pool-cluster. For example cluster 1 is associated 432 with bit position 0 in the level-3 bitmap, cluster 32 having associated level-2 bitmap portion 435 is associated 434 with bit position 31, and the like. Each bit in the level-3 bitmap associated with a particular cluster has a value of 0 if all the sub-pools in the particular sub-pool-cluster are used, and otherwise has a value of 1 indicating that at least one sub-pool in the sub-pool-cluster is free (e.g., indicating that all slots of at least one sub pool of the particular cluster are free).

In following paragraphs further describing techniques herein, the variable, slot_index, is used as a variable to indicate the next available slot in the current working sub pool.

In one embodiment, the 3-level bitmap comprising portion 442 (level-3 bitmap), 444 (level-2 bitmap) and 446 (level-1 bitmap) of FIG. 4 may be stored in 3 corresponding arrays (e.g., level-1, level-2 and level-3 word arrays) including elements each the size of a single word or 32 bits. As noted above, the memory pool may be partitioned into multiple sub pools, each include 32 slots where each bit in the level-1 bitmap corresponds to one slot of the memory pool. In this case, the level-1 bitmap has multiples of 32 bits. In other words all the bits in level_1 bitmap array of word cells or entries may be used. However, not every entry in the level-2 and level-3 word arrays may be used or include meaningful information. In other words, some entries in the level-2 and level-3 word arrays may not be associated with a corresponding sub pool or cluster.

As a first step, each level bitmap may be initialized as follows. In the level-1 bitmap, set all bits to 1 indicating that all the slots are free. In the level-2 bitmap, set all meaningful bits (associated with corresponding memory slots) to 1 indicating that all sub pools are free. In the level-2 bitmap, set all unused bits not associated with any corresponding memory slots to 0. In the level-3 bitmap, set all meaningful bits (associated with corresponding memory slots) to 1 indicating that at least one sub pool in each sub pool cluster is free. In the level-3 bitmap, set all unused bits not associated with any corresponding memory slots to 0. A variable, slot_index, is used in following description and processing and may be initialized to invalid denoting that there is no available slot.

Figure 5:
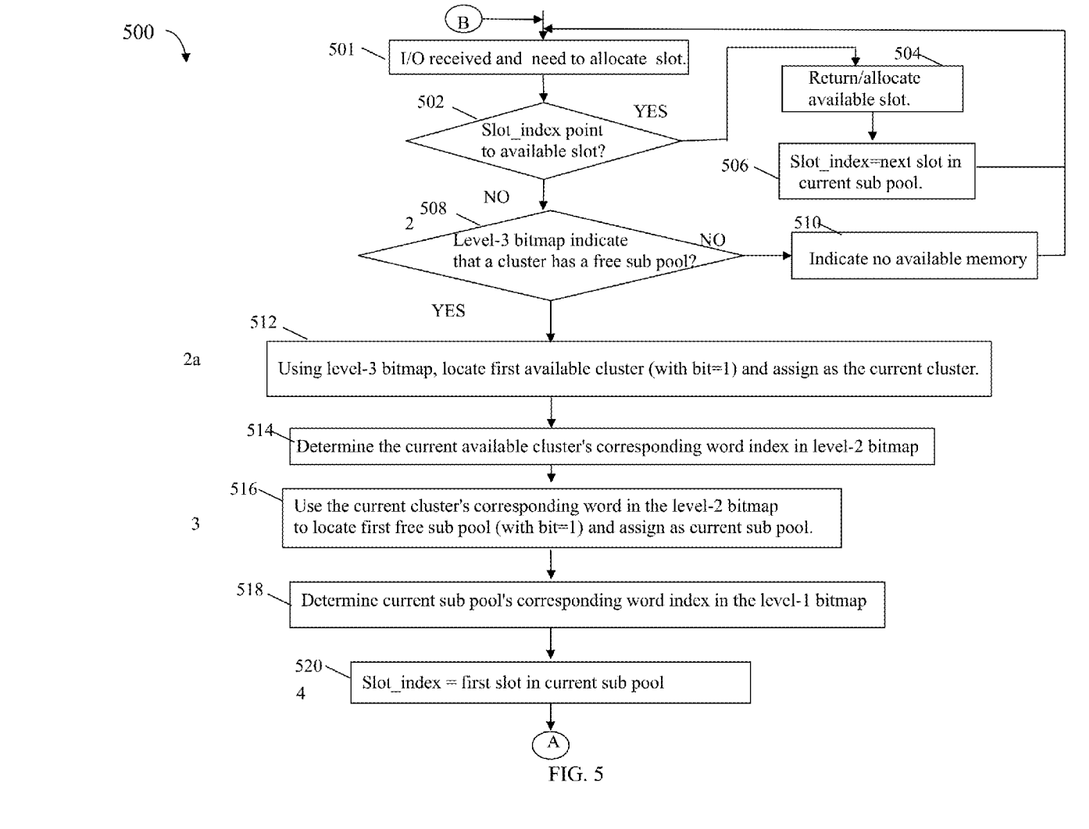
FIGS. 5, 6, 7 and 8 are flowcharts of processing steps that may be performed in an embodiment in accordance with techniques herein.
Figure 6:
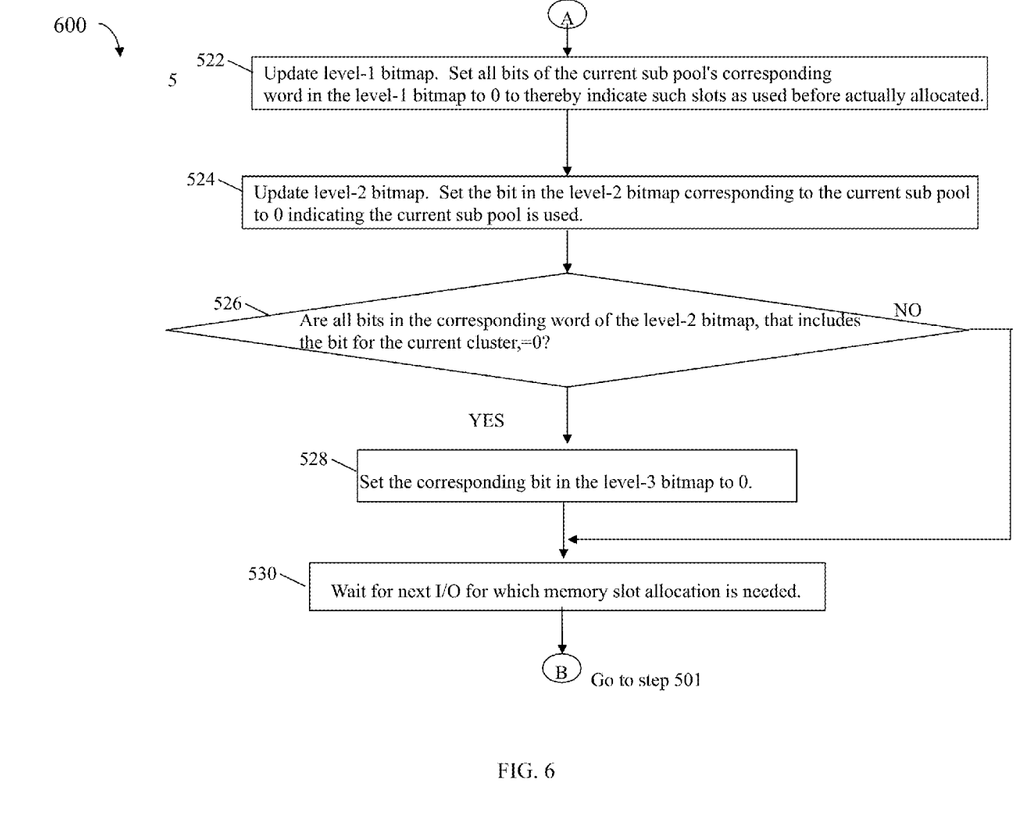

Referring to FIGS. 5 and 6, shown are flowcharts of processing steps that may be performed in an embodiment in accordance with techniques herein for memory allocation. The processing of FIGS. 5 and 6 may utilize the 3-level bitmap structure such as described and illustrated in connection with FIG. 4. Processing of FIGS. 5 and 6 may be performed, for example, by the single receive thread 204 of FIG. 2. Generally, the processing of FIGS. 5 and 6 uses the variable slot_index to identify the next memory slot available for allocation from the current sub pool. If slot_index indicates that there is an available slot in the current subpool, then processing simply returns the available slot to the requestor, such as a thread, requesting the memory and then advances the variable slot_index to the next available memory slot, if any, in the current sub pool. If the current sub pool has no remaining available memory slots for allocation, subsequent processing generally checks the multi-level bitmaps in a top down manner (e.g., from level-3 to level-1) to find a free sub pool, return the first slot in the free sub pool to the requestor, and advance slot_index to point to the second slot in the free sub pool. Generally once a free sub pool is located, the sub pool has its corresponding bit in the level-2 bitmap set to 0 indicating the sub pool is "used" and, while the free sub pool is the current sub pool being processing, the 32 free slots thereof are then used for subsequent allocation requests. The first slot of the sub pool is allocated the first time the sub pool is located and used with the remaining 31 slots thereof used for the next 31 memory slot allocation requests (e.g., by returning the current available slot and advancing the slot_index to the next slot for each request). Thus, processing in this embodiment only needs to traverse the multi-level bitmap for every 32 memory slot allocations.

Referring to the flowchart 500 of FIG. 5, at step 501, an I/O is received for which a request for memory allocation is needed. At step 502, a determination is made as to whether slot_index points to an available slot. If step 502 evaluates to yes, control proceeds to step 504 where the available slot identified by slot_index is allocated and returned to the requestor. Control proceeds to step 506 to advance slot_index to the next slot, if any, in the current sub pool of 32 slots. It should be noted that if slot_index in step 502 identifies the last or $32^{nd}$ slot in the current sub pool, then step 506 results in slot_index identifying no slot (e.g, null or invalid). From step 506, processing returns to step 501 to wait for the next I/O to be received for which a slot allocation is needed.

If step 502 evaluates to no, control proceeds to step 508 where a determination is made as to whether the level-3 bitmap indicates that a cluster has a free sub pool. In other words, step 502 may examine the level-3 bitmap to determine whether there is any bit that has a value of 1 thereby indicating that the particular cluster associated with the bit=1 includes at least one sub pool that is free. If step 508 evaluates to no, control proceeds to step 510 where a determination is made that there is currently no memory of the memory pool available for allocation. From step 510 control returns to step 501.

If step 508 evaluates to yes, control proceeds to step 512 where processing is performed using the level-3 bitmap to locate the first available cluster having a bit=1 in the level-3 bitmap. The cluster corresponding to the first such located bit=1 in the level-3 bitmap may be assigned to the processing variable current cluster. At step 514, processing is performed to determine the current cluster's corresponding word index in the level-2 bitmap and then determine the current cluster's corresponding word or entry of the level-2 bitmap. The foregoing word of the level-2 bitmap for the current cluster may correspond, for example, to element 422 of FIG. 4 if the current cluster is cluster 1.

Step 516 then uses the current cluster's corresponding word of the level-2 bitmap to locate the first free sub pool of the current cluster where the first free sub pool is assigned as the current sub pool. Each sub pool that is free and located in the current cluster has a corresponding bit=1 in the current cluster's corresponding word of the level-2 bitmap. For example, with reference to FIG. 4, assume that cluster 1 is the current cluster having at least one free sub pool and that the current cluster has the corresponding level-2 bitmap word 422. With reference to 422 of FIG. 4, each bit in 422 that is 1 denotes a corresponding sub pool in cluster 1 that is free. Step 516 may sequentially search the bit settings in 422 for the current cluster to locate the first occurring bit having a value=1. The sub pool corresponding to the first occurring bit of 422=1 may be assigned as the current sub pool.

In step 518, the current sub pool's corresponding word index in the level-1 bitmap is determined and then used to determine the current sub pool's corresponding word or entry of the level-1 bitmap. For example, with reference to FIG. 4, assume the first bit in the level-2 bitmap portion 422 for the current cluster is 1, thereby indicating that sub pool 0 of the current cluster is free. Step 518 determines that the sub pool 0 of the current cluster corresponds to the first or $0^{th}$ entry 410 in the level-1 bitmap 446. Step 520 proceeds with assigning slot_index the first or $0^{th}$ slot in the sub pool 0 412 of the current cluster 1.

In step 522, the level-1 bitmap may be updated. Step 522 may include setting all bits of the current subpool's corresponding word in the level-1 bitmap to 0 thereby indicating such slots as used before actually allocated. With reference back to FIG. 4 where sub pool 0 412 is the current sub pool, step 522 may include setting all bits of 410 of the level-1 bit to 0. At step 524, the level-2 bitmap may be updated. Step 524 may include setting the bit, of the level-2 bitmap corresponding to the current sub pool, to 0 thereby indicating the current sub pool is used. With reference back to FIG. 4, step 524 may include setting bit 0 of word 422 if the current sub pool is sub pool 0 412.

Processing may be performed in steps 526 and 528 to perform any needed updating to the level-3 bitmap. At step 526, a determination is made as to whether all bits in the corresponding word of the level 2 bitmap (where the corresponding word includes the bit for the current cluster) are equal to 0. If step 526 evaluates to no, no update to the level-3 bitmap is needed. If step 526 evaluates to no, control proceeds to step 530 to wait for the next I/O for which memory slot allocation is needed and then control proceeds to step 501. If step 526 evaluates to yes, control proceeds to step 528 to update the corresponding bit in the level-3 bitmap whereby such corresponding bit in the level-3 bitmap corresponds to the word of the level 2 bitmap having all 0 bit settings as determined n step 526. With reference to FIG. 4, if step 526 determines that all bits in the word 422 of the level-2 bitmap are 0, step 528 proceeds to set the corresponding bit as denoted by 432 in the level-3 bitmap 430 to 0. From step 528, processing continues with step 530.

Figure 7:
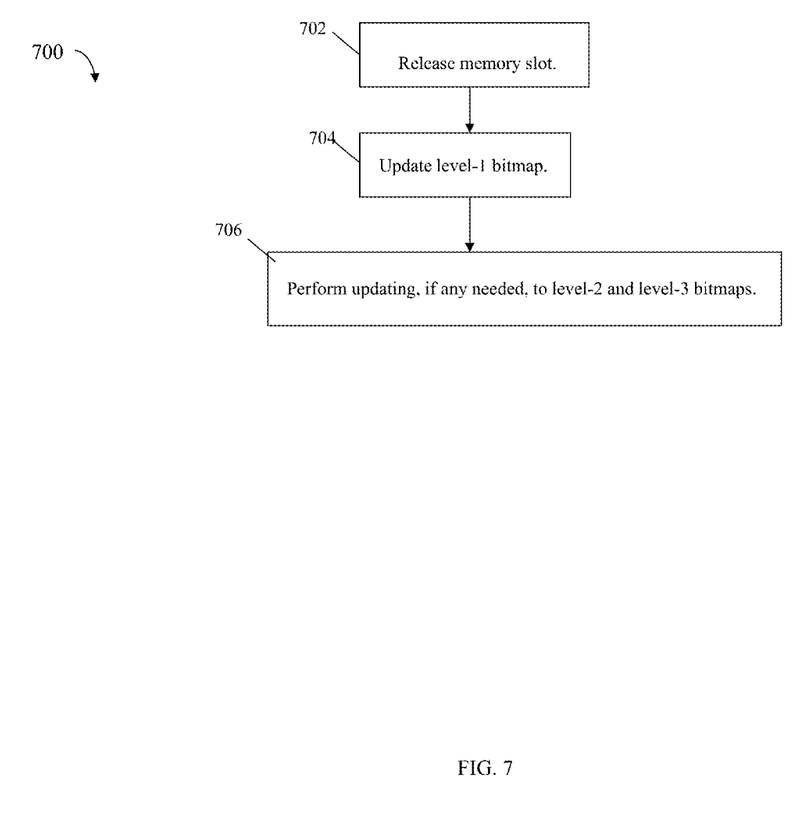
Figure 8:
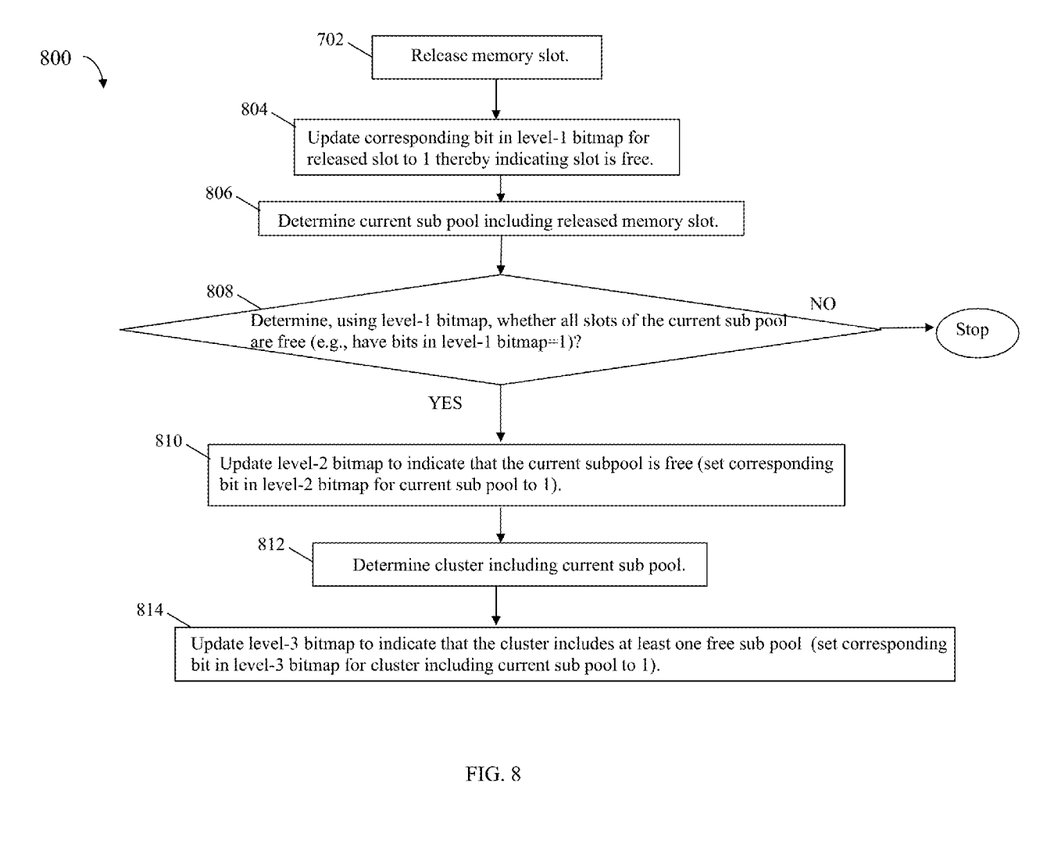

What will now be described with reference to FIGS. 7 and 8 is processing that may be performed in connection with memory releasing or deallocation in an embodiment in accordance with techniques herein. Processing of FIGS. 7 and 8 may be performed, for example, by each of the I/O process threads 206a-n of FIG. 2 in response to a request to deallocate a memory slot whereby the memory slot is freed. Generally, when releasing a memory slot, processing marks the slot as free (e.g., sets its bit=1) in the level_1 bitmap. Additionally, if all the slots in the corresponding sub-pool including the released memory slot are marked as free, the corresponding sub-pool is also marked as free in the level_2 bitmap and the corresponding sub-pool-cluster in the level-3 bitmap is also accordingly updated to indicate that at least one subpool of the cluster is free. In an embodiment as described with the multi-level bitmap arrangement as in FIG. 4 where each of the different level bitmaps may be implemented as an array of 32-bit word entries, processing may be easily performed to determine the appropriate array cell or index and bit offset in each level bitmap from the memory slot starting address.

Referring to FIG. 7, shown is a first high level flowchart 700 of processing steps that may be performed in an embodiment in accordance with techniques herein for releasing memory. At step 702, a memory slot may be released. In step 704, the level-1 bitmap is accordingly updated to indicate that the particular memory slot is now free. In step 706, processing is performed to perform updating, if any is needed, to the level-2 and level-3 bitmaps.

Referring to FIG. 8, shown is a second flowchart 800 of processing steps that may be performed in an embodiment in accordance with techniques herein for releasing memory. FIG. 8 provides additional detail regarding processing of steps 704 and 706 of FIG. 7. At step 702, a memory slot may be released. At step 804, the corresponding bit in the level-1 bitmap for the released slot is updated to 1 thereby indicating that the associated memory slot that has been released in step 702 is free. At step 806, processing is performed to determine the current sub pool including the released memory slot. At step 808, a determination is made using the level-1 bitmap as to whether all slots of the current sub pool are free (e.g., have bits in the level-1 bitmap=1 for all such slots of the current sub pool). If step 808 evaluates to no, processing associated with releasing memory may stop. If step 808 evaluates to yes, control proceeds to step 810 to update the level-2 bitmap to indicate that the current sub pool is free. Step 810 may include setting the corresponding bit for the current sub pool in the level-2 bitmap to 1. At step 812, the cluster including the current sub pool is determined. At step

814, processing is performed to update the level-3 bitmap to indicate that the cluster includes at least one free sub pool (e.g., set corresponding bit in level-3 bitmap for the cluster including the current sub pool to 1).

Referring back to FIG. 4, it should be noted that in one embodiment described herein, each of level bitmaps may be implemented as an array of elements or cells where each cell or array element is 32 bits. For example, element 442 may denote the level-3 bitmap with a bit corresponding to each cluster as described above. The level-3 bitmap may be implemented using an array of cells or element each the size of a word or 32 bits. For example, each array element, such as denoted by element 430, of the level-3 bitmap array may include level-3 bitmap information for 32 clusters. In a similar manner, the level-2 bitmap denoted by 420 may be implemented using an array of cells or element each the size of a word or 32 bits. For example, each array element, such as denoted by elements 422, 435, of the level-2 bitmap array may include level-2 bitmap information for 32 sub pools of the same cluster. Thus, element 422 may be the first cell in the level-2 bitmap array and include level-2 bitmap information for all sub pools of the first cluster 1. In a similar manner, the level-1 bitmap denoted by 410 may be implemented using an array of cells or element each the size of a word or 32 bits. For example, each array element, such as denoted by elements 410, 411 and 412, of the level-1 bitmap array may include level-1 bitmap information for 32 slots of the same sub pool. Thus, element 410 may be the first cell in the level-1 bitmap array and include level-1 bitmap information for all slots of the first sub pool 0 of the first cluster 1.

The following should be noted in connection with the consistency of bit operations at each level of the multi-level bitmap since processing described herein is performed without using any lock(s). As discussed above in connection with FIG. 2, in an embodiment in accordance with techniques herein with a single memory pool, there is only one thread (I/O receiving thread 204) that issues memory allocation requests. There may be multiple threads (IO processing threads 1–N) issuing memory release requests. Keep in mind that in order to improve the memory operation performance, techniques herein do not us any locks but such techniques herein provides for consistency of bit operations in each level bitmap as discussed below.

In connection with the level-1 bitmap, each bit corresponds to one slot. Slot allocating is always ahead of slot releasing since there is only one thread allocating memory from the pool. Clearing a bit in the level-1 bitmap may be characterized as performed prior to setting the bit so there is no inconsistency expected on this level-1 bitmap.

In connection with the level-2 bitmap, each bit corresponds to one sub pool. Sub-pool allocating is always ahead of sub-pool releasing. As with the level-1 bitmap, no inconsistency is expected on this level.

In connection with the level-3 bitmap, each bit corresponds to one cluster of sub pools. The I/O receiving thread may clear the bit in the level-3 bitmap and multiple I/O processing threads may set the same bit in the level-3 bitmap concurrently. The case may occur, for example, when there is only one available sub-pool left in a particular cluster, the I/O receiving thread is allocating this sub pool and at the time the I/O processing threads are releasing other sub pools (when releasing one sub pool, processing always sets the sub pool cluster bit in level-3 bitmap). Without a lock, processing herein cannot guarantee the bit setting and bit clearing order. So the end result is indeterminate. The result is unexpected if the bit clearing beats the bit setting. Since the bit 0 in level-3 bitmap will stop processing herein from allocating sub pools even they are available. However, the unexpected bit 0 is subsequently repaired by other forthcoming sub-pool releasing operations. The foregoing is one tradeoff made in accordance with techniques herein.

An embodiment in accordance with techniques herein may be characterized in one aspect as making tradeoffs to provide for lock-free techniques. As a first consideration, there is only one thread to allocate memory, but multiple threads may release memory as described elsewhere herein. As a second consideration, due to the possible race condition noted above occurring in connection with the level-3 bitmap, a temporary window may be introduced to block processing from allocating some available sub-pools. As a third consideration, processing herein does not release a sub pool until all slots in the sub pool are free. As a fourth consideration, all slots of the memory pool may be the same size.

With the first two considerations noted above, processing herein avoids using any lock which may result in an improvement in performance in connection with both the memory allocating and releasing processing. With the last two considerations noted above, processing herein may result in improvement in allocation performance since processing herein only has to look though the multi-level bitmap every 32 allocating operations (e.g., the number of slots in a single sub pool).

The inventors have determined, through testing and/or simulation of conditions using techniques herein, an embodiment in accordance with techniques herein may guarantee that the worst time cost performance for allocating and releasing a slot is a constant. For example, based on testing performed by the inventors with respect to an existing linked list based technique using locks, performance in connection with memory allocation and releasing has improved 900%. The following table provides an example of processing times obtained by the inventors in connection with an embodiment in accordance with techniques herein versus an existing linked list based technique using locks for memory allocation and releasing:

|  | Allocate a slot | Release a slot |
|---|---|---|
| Link based lock protected algorithm | 2000 CPU cycles | 1000 CPU cycles |
| Multi-level bitmap based algorithm | 100 CPU cycles | 100 CPU cycles |

It should be noted that although techniques herein are described with respect to a 3-level bitmap where the number of sub pools in a single cluster is 32 and the number of memory slots in a single sub pool is 32, more generally, techniques herein may be applied for use in an embodiment where the bitmap is N levels, N>2, and the number of elements in the different groupings at each level is any suitable number and not limited to being 32.

For example, consider a case where techniques herein are extended into more than 3-levels where the memory pool is partitioned into a different number of levels, X, greater than 3. For the allocating procedure, consider the case where processing is performed to locate a free sub pool, or more generally, free group of slots at level 2. In connection with an embodiment in accordance with techniques herein consistent with other description herein, such processing may attempt to locate a free sub pool or group of slots at level 2 by examining the bit map levels beginning with level-X bitmap and further processing down to the level-1 bitmap.

Furthermore, allocation processing may also update the X-level bitmaps from the bottom level 1 and up (in order beginning with level-1 to level-X bitmap). Generally, if a first group of the bits in level-m (m>=2 and m<=X−1) are all 0 (indicating that memory portions associated with first group of bits are all free or deallocated) and the first group of bits is associated with a single bit at level m+1, processing may be performed to update the corresponding bit in the level-m+1 bitmap to zero.

Continuing with the foregoing example where techniques herein are extended into more than 3-levels where the memory pool is partitioned into a different number of levels, X, greater than 3. For the memory releasing or deallocation procedure, processing may be performed to set the released slot's level-1 bit to 0 and then perform processing to determine whether a first sub pool or grouping of slots having a single corresponding bit in the level-2 bitmap are all free (are all slots in first sub pool are free or deallocated). If so, processing is then further performed to set to 1 the single corresponding bit in the level-2 bitmap for the first sub pool and also set=1 an appropriate corresponding bit in each of the levels 3 and above for groups at such higher levels which other include the first sub pool having all slots free (e.g., in other words, the bit in each level-m bitmap for m>2).

To further illustrate, consider an example with a 4-level bitmap which includes the 3-level bitmap such as described above an illustrated in FIG. 4 with an additional level-4 bitmap which includes a bit for each grouping of clusters, such as each grouping of 32 level-3 clusters. For memory allocation, processing may be performed such as described above and in connection with FIGS. 5 and 6. Assume a current level-4 group denotes the group of level-3 clusters including the current cluster which includes the slot currently being allocated. If processing of FIGS. 5 and 6 has executed step 528 where the corresponding bit in the level-3 bitmap has been set to 0, additional processing is then performed to determine whether to set the corresponding bit in the level-4 bitmap for the current level-4 group. Generally, the corresponding bit in the level-4 bitmap for the current level-4 group of clusters is set to 0 if all bits for the clusters of the current level-4 group are all 0. The foregoing setting a bit in the level-4 bitmap indicates that all clusters of the denoted level-4 cluster grouping are used (e.g., there is not at least one free level-2 sub pool in the level-4 grouping of clusters). Generally, each bit in the level-4 or higher bitmap has a setting of 0 or 1 representing that as described herein in connection with a bit in the level-3 bitmap. That is, each bit in the level-4 bitmap with a value of 1 indicates that there is at least one sub pool (at level 2) associated with the level-4 bit that is free, and a value of 0 indicates that all sub pools associated with the level-4 bit are used. Further, if there is a level-5 bitmap, each bit in the level-5 bitmap with a value of 1 indicates that there is at least one sub pool (at level 2) associated with the level-5 bit that is free, and a value of 0 indicates that all sub pools associated with the level-5 bit are used.

In connection with memory releasing or deallocation with a level-4 bitmap, if step 808 of FIG. 8 evaluates to yes, processing also includes updating the level-4 bitmap to 1 to indicate that at least one sub pool (at level 2) is free. More generally, if there are further higher level bitmaps (levels>4) each including a bit associated with the free sub pool, such processing also sets the bit to 1, at each higher level, where the bit associated with the free sub pool. Generally, a bit in a level-K bitmap, K>3, has a value of 1 if there is at least one level-2 sub pool in which all slots thereof are free or deallocated, and the bit has a value of 0 otherwise.

In an embodiment in accordance with techniques herein used for memory management, the techniques are described herein, such as in connection with FIG. 2, with respect to a single memory pool. An embodiment may include multiple instances of memory pools and may accordingly implement techniques herein such as illustrated in FIG. 2 with respect to each individual memory pool. In such an embodiment, each memory pool may individually include memory slots of the same size. However, the size of slots in different memory pools may vary. In this manner, techniques herein may be used in connection with a total amount of memory that is partitioned into multiple pools each including slots of a different size. Thus, although techniques herein use a single slot size with respect to a single memory pool, techniques herein may be more generally applied in a system with multiple such memory pools allowing for a different slot size per pool. In an embodiment using techniques herein on a multi-core or multi-processor system, techniques herein may be applied for use with a memory pool per processor or core. For example, a first processor may be associated with a first memory pool where a single receive thread an multiple I/O processing threads are utilized for the first memory pool. Additionally, a second processor may be associated with a second memory pool where a single receive thread an multiple I/O processing threads are utilized for the second memory pool.

The techniques herein may be performed by executing code which is stored on any one or more different forms of computer-readable media. Computer-readable media may include different forms of volatile (e.g., RAM) and non-volatile (e.g., ROM, flash memory, magnetic or optical disks, or tape) storage which may be removable or non-removable.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method of performing memory management comprising:
   receiving an N-level bitmap, N being an integer greater than two, wherein a memory pool is partitioned into a plurality of slots, each slot of the memory pool having a corresponding bit in level-1 of the N-level bitmap, where the corresponding bit in level-1 of the N-level bitmap for said each slot indicates whether said each slot is used or free, wherein the plurality of slots of the memory pool are further grouped into a hierarchy including N levels;
   receiving, by a first thread, a first request to allocate a first slot of the memory pool;
   responsive to receiving the first request, said first thread performs first processing to allocate said first slot using the N-level bitmap, wherein allocation requests each to allocate one or more slots from the memory pool are only processed by the first thread;
   receiving by a second of a plurality of threads, a second request to free a second slot of the memory pool whereby the second slot is returned to the memory pool; and
   responsive to receiving the second request, said second thread performs second processing using the N-level bitmap to free said second slot, wherein requests each to free one or more slots of the memory pool are processed by the plurality of threads.

2. The method of claim 1, wherein each bit in the level-1 of the N-level bitmap corresponding to one of the slots of the memory pool has a value of zero if said one slot is used and otherwise has a value of one if said one slot is free.

3. The method of claim 2, wherein the plurality of slots of the memory pool are partitioned into a plurality of sub pools, each of the plurality of sub pools including a same amount of the plurality of slots of the memory pool, each of the plurality of sub pools being associated with a different bit in level-2 of the level-N bitmap, wherein said different bit indicates whether said each sub pool is free or used.

4. The method of claim 3, wherein said different bit has a value of one if all slots of said each sub pool are free, and otherwise said different bit has a value of zero indicating said each sub pool is used.

5. The method of claim 4, wherein the plurality of sub pools are partitioned into a plurality of clusters, each of said plurality of clusters including a same amount of the plurality of sub pools, each of the plurality of clusters being associated with a corresponding bit in level-3 of the level-N bitmap, wherein said corresponding bit in level-3 of the level-N bitmap indicates whether at least one sub pool of said each cluster is free.

6. The method of claim 5, wherein said corresponding bit in level-3 of the level-N bitmap has a value of one if at least one sub pool of said each cluster is free wherein all slots of said at least one sub pool are free, and otherwise said corresponding bit in level-3 of the level-N bitmap has a value of zero indicating all sub pools of said each cluster are used.

7. The method of claim 6, wherein the plurality of clusters are partitioned into a plurality of cluster groups, each of said plurality of cluster groups including a same amount of the plurality of clusters, each of the plurality of cluster groups being associated with a corresponding bit in level-4 of the level-N bitmap, wherein said corresponding bit in level-4 of the level-N bitmap indicates whether at least one sub pool of said each cluster group is free.

8. The method of claim 7, wherein said corresponding bit in level-4 of the level-N bitmap has a value of one if at least one sub pool of said each cluster group is free wherein all slots of said at least one sub pool are free, and otherwise said corresponding bit in level-4 of the level-N bitmap has a value of zero indicating all sub pools of said each cluster group are used.

9. The method of claim 1, wherein said first processing includes:
determining whether a current sub pool includes a slot available for allocation;
if the current sub pool includes an available slot, allocating said available slot as said first slot;
if it is determined that the current sub pool does not include a slot available for allocation, using the N-level bitmap to perform third processing to determine whether there is a free sub pool in the memory pool.

10. The method of claim 9, wherein said third processing further comprises:
examining levels N through 2 of the N-level bitmap to locate a first sub pool wherein all slots of the first sub pool are free.

11. The method of claim 10, wherein the method further comprises:
for each slot in the first sub pool having an associated bit in the level-1 bitmap, updating said associated bit in the level-1 bitmap to zero thereby indicating said each slot of the first sub pool is used; and
updating a second bit in level-2 of the N-level bitmap corresponding to the first sub pool to zero thereby indicating said first sub pool is used.

12. The method of claim 11, further comprising:
determining a cluster including the first sub pool, said cluster having a corresponding third bit in level-3 of the N-level bitmap corresponding to the cluster; and
setting the third bit to zero if each sub pool of the cluster has a corresponding bit in the level-2 of the N-level bitmap currently set to zero thereby indicating that said each sub pool is used.

13. The method of claim 1, wherein said second processing comprises:
updating a first bit of level-1 of the N-level bitmap, said first bit corresponding to said second slot and said updating setting the first bit to one thereby indicating said second slot as free.

14. The method of claim 13, wherein a second sub pool includes the second slot, said second sub pool being associated with a corresponding bit of level-2 of the N-level bitmap, and the method further comprising:
determining whether all slots in the second sub pool are free;
responsive to determining that all slots in the second sub pool are free, performing other processing including:
setting the corresponding bit of level-2 of the N-level bitmap associated with the second sub pool to one thereby indicating all slots of the second sub pool are free; and
determining a first cluster including the second sub pool;
updating a third bit in level-3 of the N-level bitmap associated with the first cluster to one thereby indicating at least one sub pool of the first cluster is free whereby all slots of the at least one sub pool are free.

15. The method of claim 1, wherein the memory pool is a first of a plurality of memory pools of a system, said first memory pool being partitioned into slots each of a first size and a second of the plurality of memory pools being partitioned into slots each of a second size different from the first size.

16. The method of claim 15, wherein memory management of the second memory pool is performed using a third thread and another plurality of threads, wherein only the third thread processes requests to allocate slots from the second memory pool using a second N-level bitmap, and wherein each thread of the another plurality of threads performs processing using the second N-level bitmap to free slots returned to the second memory pool.

17. A system comprising:
a processor; and
a memory comprising code stored thereon that, when executed by the processor, performs a method of memory management comprising:
receiving an N-level bitmap, N being an integer greater than two, wherein a memory pool is partitioned into a plurality of slots, each slot of the memory pool having a corresponding bit in level-1 of the N-level bitmap, where the corresponding bit in level-1 of the N-level bitmap for said each slot indicates whether said each slot is used or free, wherein the plurality of slots of the memory pool are further grouped into a hierarchy including N levels;
receiving, by a first thread, a first request to allocate a first slot of the memory pool;

responsive to receiving the first request, said first thread performs first processing to allocate said first slot using the N-level bitmap, wherein allocation requests each to allocate one or more slots from the memory pool are only processed by the first thread;

receiving by a second of a plurality of threads, a second request to free a second slot of the memory pool whereby the second slot is returned to the memory pool; and responsive to receiving the second request, said second thread performs second processing using the N-level bitmap to free said second slot, wherein requests each to free one or more slots of the memory pool are processed by the plurality of threads.

18. A non-transitory computer readable medium comprising code stored thereon that, when executed, performs a method of memory management comprising:

receiving an N-level bitmap, N being an integer greater than two, wherein a memory pool is partitioned into a plurality of slots, each slot of the memory pool having a corresponding bit in level-1 of the N-level bitmap, where the corresponding bit in level-1 of the N-level bitmap for said each slot indicates whether said each slot is used or free, wherein the plurality of slots of the memory pool are further grouped into a hierarchy including N levels;

receiving, by a first thread, a first request to allocate a first slot of the memory pool;

responsive to receiving the first request, said first thread performs first processing to allocate said first slot using the N-level bitmap, wherein allocation requests each to allocate one or more slots from the memory pool are only processed by the first thread;

receiving by a second of a plurality of threads, a second request to free a second slot of the memory pool whereby the second slot is returned to the memory pool; and responsive to receiving the second request, said second thread performs second processing using the N-level bitmap to free said second slot, wherein requests each to free one or more slots of the memory pool are processed by the plurality of threads.

19. The non-transitory computer readable medium of claim 18, wherein each bit in the level-1 of the N-level bitmap corresponding to one of the slots of the memory pool has a value of zero if said one slot is used and otherwise has a value of one if said one slot is free.

20. The non-transitory computer readable medium of claim 19, wherein the plurality of slots of the memory pool are partitioned into a plurality of sub pools, each of the plurality of sub pools including a same amount of the plurality of slots of the memory pool, each of the plurality of sub pools being associated with a different bit in level-2 of the level-N bitmap, wherein said different bit indicates whether said each sub pool is free or used.

* * * * *

UNITED STATES PATENT AND TRADEMARK OFFICE
CERTIFICATE OF CORRECTION

PATENT NO. : 9,898,197 B1
APPLICATION NO. : 14/669534
DATED : February 20, 2018
INVENTOR(S) : Hangpo Gao et al.

Page 1 of 1

It is certified that error appears in the above-identified patent and that said Letters Patent is hereby corrected as shown below:

On the Title Page (71) Applicant should read: EMC IP Holding Company LLC, Hopkinton, MA (US)

Signed and Sealed this
Tenth Day of July, 2018

Andrei Iancu
*Director of the United States Patent and Trademark Office*